United States Patent
Liu et al.

(10) Patent No.: US 6,641,757 B2
(45) Date of Patent: Nov. 4, 2003

(54) SERVO-DRIVEN TYPE MOLD CLAMPING UNIT MOLD PROTECTION METHOD

(75) Inventors: Hsing-Chang Liu, Hsinchu (TW); Ken-Hsien Lai, Hsinchu (TW); Hen-Chieh Chang, Taipei (TW); Yu-Chu Hsu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 10/079,418

(22) Filed: Feb. 22, 2002

(65) Prior Publication Data

US 2003/0160344 A1 Aug. 28, 2003

(51) Int. Cl.⁷ ............................................... B29C 45/64

(52) U.S. Cl. ..................... 264/40.1; 264/40.5; 425/137

(58) Field of Search ............................... 264/40.5, 40.1; 425/135, 137, 150, 162

(56) References Cited

U.S. PATENT DOCUMENTS

| | | | | | |
|---|---|---|---|---|---|
| 4,710,119 | A | * | 12/1987 | Otake | 425/136 |
| 4,846,654 | A | * | 7/1989 | Neko | 425/150 |
| 5,045,253 | A | * | 9/1991 | Kamiguchi et al. | 264/40.5 |
| 5,102,327 | A | * | 4/1992 | Reinhart | 425/590 |
| 5,800,750 | A | * | 9/1998 | Laing et al. | 264/40.5 |
| 6,419,861 | B1 | * | 7/2002 | Stirn et al. | 419/29 |
| 6,439,875 | B1 | * | 8/2002 | Morita et al. | 425/556 |
| 2002/0066971 | A1 | * | 6/2002 | Takashi | 264/40.1 |

* cited by examiner

*Primary Examiner*—Jill Heitbrink
*Assistant Examiner*—Monica A. Fontaine
(74) *Attorney, Agent, or Firm*—Browdy and Neimark PLLC

(57) ABSTRACT

A method for protecting a mold of a servo-driven type mold clamping unit comprises the steps of (a) changing the torque output of the power source generated by a servo-motor subject to the position of a movable die of the mold, and (b) comparing the values set in an encoder of the servo-motor with signal received by the encoder when the movable die is in displacement so as to detect the presence of any foreign objects in the mold for determination of normal/abnormal handling control.

6 Claims, 2 Drawing Sheets motor torque output-VS-position movable die displacement position-VS-mechanical advantage

SERVO-DRIVEN TYPE MOLD CLAMPING UNIT MOLD PROTECTION METHOD

FIELD OF THE INVENTION

The present invention relates to a mold for the servo-driven type mold clamping unit of injection molding machine and, more specifically, to a method of protecting the mold of the servo-driven type mold clamping unit of an injection molding machine.

BACKGROUND OF THE INVENTION

A regular injection-molding machine is generally comprised of a machine base, a mold-clamping unit, an injection unit, and an electric control system. The mode-clamping unit comprises a mold, a plurality of tie rods, and a toggle mechanism. The mold is comprised of a fixed die and a movable die. The tie rods connect the fixed die and the movable die. The toggle mechanism is connected between a drive member, which generates a driving force, and the movable die, and the toggle member is driven by the drive member to move the movable die back and forth along the tie rods relative to the fixed die.

In order to protect the mold, preventing the movable die from squeezing a foreign object during its closing stroke, a mold protection method is provided. A known mold protection method is to set a mold protection zone and a time limit in which the movable die passes from the start of the mold protection zone to the end thereof during movable die feed stroke, and to let the movable die pass the set mold protection zone at a low pressure and low speed. If the movable die does not pass through the mold protection zone within the set time limit, it is judged that a foreign object exists in the mold and, the movable die is immediately stopped or returned to its initial status.

According to the aforesaid mold protection method, the movable die passes through the mold protection zone at a low pressure and low speed. However, because the movable die is linked to the toggle mechanism that changes its mechanical advantage subject to the change of position, the mechanical advantage of the toggle mechanism applied to the movable die is high and the low pressure driving force is not maintained unchanged when the movable die touches a foreign object, thereby causing a high squeezing force to be produced at the movable die against the existing foreign object. In this case, the mold tends to be damaged. Furthermore, the movable die can be returned to its original position only after he set mold protection time limit is up and the movable die does not pass the end of the mold protection zone. This mold protection method cannot proceed to the abnormality handling procedure (return the movable die to the initial position) immediately upon the presence of a foreign object, resulting in a risk of damage to the mold.

There is known another method to detect the presence of a foreign object in the mold subject to the variation of the current output of the motor. According to this method, a current detection point and a current output point must be set in the controller and the motor respectively. This method cannot eliminate the problems of low resolution and high interference of noises. In actual practice, this method has the disadvantages of low reliability and high cost.

SUMMARY OF THE INVENTION

It is the main object of the present invention to provide a servo-driven type mold clamping unit mold protection method, which detects the presence of a foreign object in the mold in real time and, takes the necessary measure immediately upon the detection of the presence of a foreign object in the mold to protect the mold.

To achieve the object of the present invention, the method for protecting a mold of a servo-driven type mold clamping unit comprises the steps of (a) changing the torque output of the power source generated by a servo-motor subject to the position of a movable die of the mold, and (b) comparing the values set in an encoder of the servo-motor with signal received by the encoder when the movable die is in displacement so as to detect the presence of any foreign objects in the mold for determination of normal/abnormal handling control.

DETAILED DESCRIPTION OF THE INVENTION

Referring to FIGS. from 1 through 3, a servo-driven type mold clamping unit mold protection method 100 comprises the steps of: (a) changing the torque output of the servo-motor subject to the position of the movable die, and (b) detecting the existence of any foreign objects in the mold by means of the encoder of the servo-motor.

Figure 2:
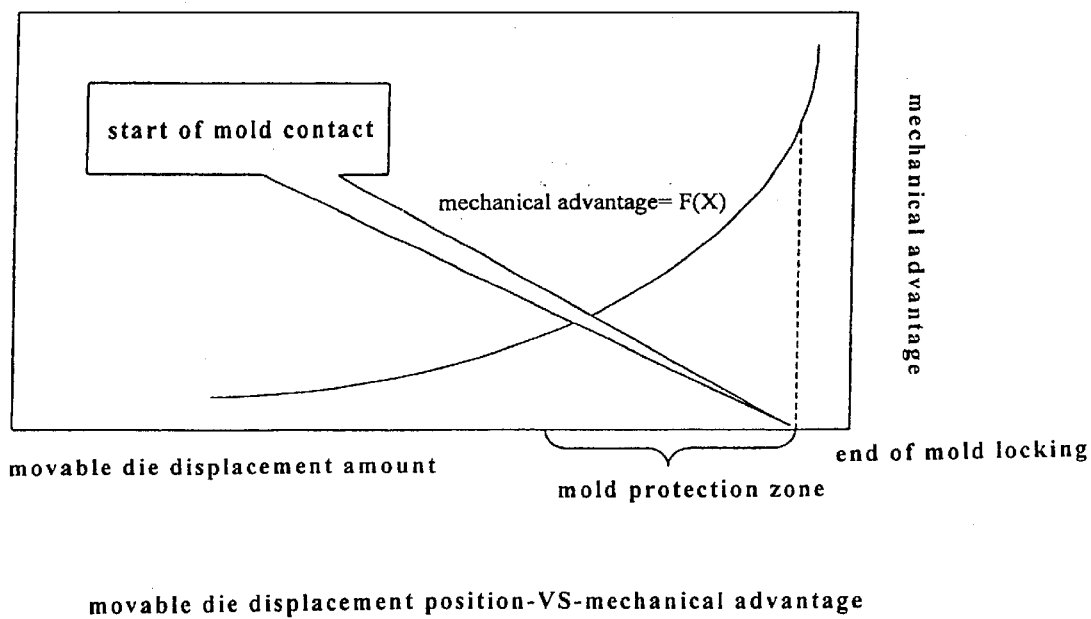
FIG. 2 is a movable die displacement-VS-mechanical advantage curve obtained according to the present invention.

In Step (a):

Because the toggle mechanism which is driven by the servo-motor has the characteristic of changing the mechanical advantage resulting from the torque of the servo-motor subject to the position displacement of the movable die under a constant value of the output torque of the servo-motor (see the chart of movable die displacement position-VS-mechanical advantage of FIG. 2), the relationship between the servo-motor output torque and the movable die position can be expressed by the following equation:

$$Tq(x)\% = 1/F(x) \times \text{Gain } \%$$

in which, x: position of the movable die.

Tq(x): driving force (torque) produced by the servo-motor, which varies with the position of the movable die, and, the maximum torque output is 100%.

F(x): mechanical advantage of the toggle mechanism that varies with the position of the movable die.

Meaning of Gain: based on the rule that the minimum torque output of the servo-motor is able to move the movable die subject to set velocity.

Determination of Gain: start searching from the minimum value, for example, 1, 2, . . . 100.

According to the aforesaid equation, when the user set the speed of the movable die in the mold protection zone during clamping mold setting process under the normal condition, the torque output of the servo-motor varies with the position displacement of the movable die, and the change is made subject to the following two factors, i.e. the factor of the inverse function of the mechanical advantage of the toggle mechanism, and the factor of the minimum torque output of closing the mold at the set speed. Therefore, only the minimum motor torque is provided to the movable die to achieve a low-pressure protection effect subject to the position of the movable die in the mold protection zone.

In Step (b):

When setting the displacement speed of the movable die in the mold protection zone, set into the encoder of the servo-motor, based on the aforesaid equation, the following three corresponding parameters, i.e., the parameter of the position of the movable die at a particular point in the mold protection zone, the parameter of the torque output of the servo-motor subject to the position of the movable die, and the parameter of the displacement time needed for the placement of the movable die to a particular point in between the start point of the mold protection zone and the end of the mold protection zone (set the parameters of the position of the movable die, the time required to move the movable die to the position, and the corresponding torque output of the servo-motor for moving the movable die to the position). By means of a real time analysis of comparing the parameters set in the encoder with the actual servo-motor torque output received by the movable die when passing through the mold protection zone, the actual movable plate displacement amount, and the displacement time of the movable die to a particular point in the mold protection zone, the encoder detected the presence of a foreign object in the mold upon the production of an error value between the set value and the actual value. When a foreign object detected, the movable die is returned to its original position.

In other words, the encoder makes a set value subject to the parameters of the torque of the servo-motor, the position of the movable die, and the time required to move the movable die to the position, and then encodes the set value into a command pulse signal, and then outputs the signal to the servo-motor, and at the same time compares the set value with the value obtained from actual action for determining the existence of any abnormality.

The invention will be fully understood by way of the following example.

Figure 1:
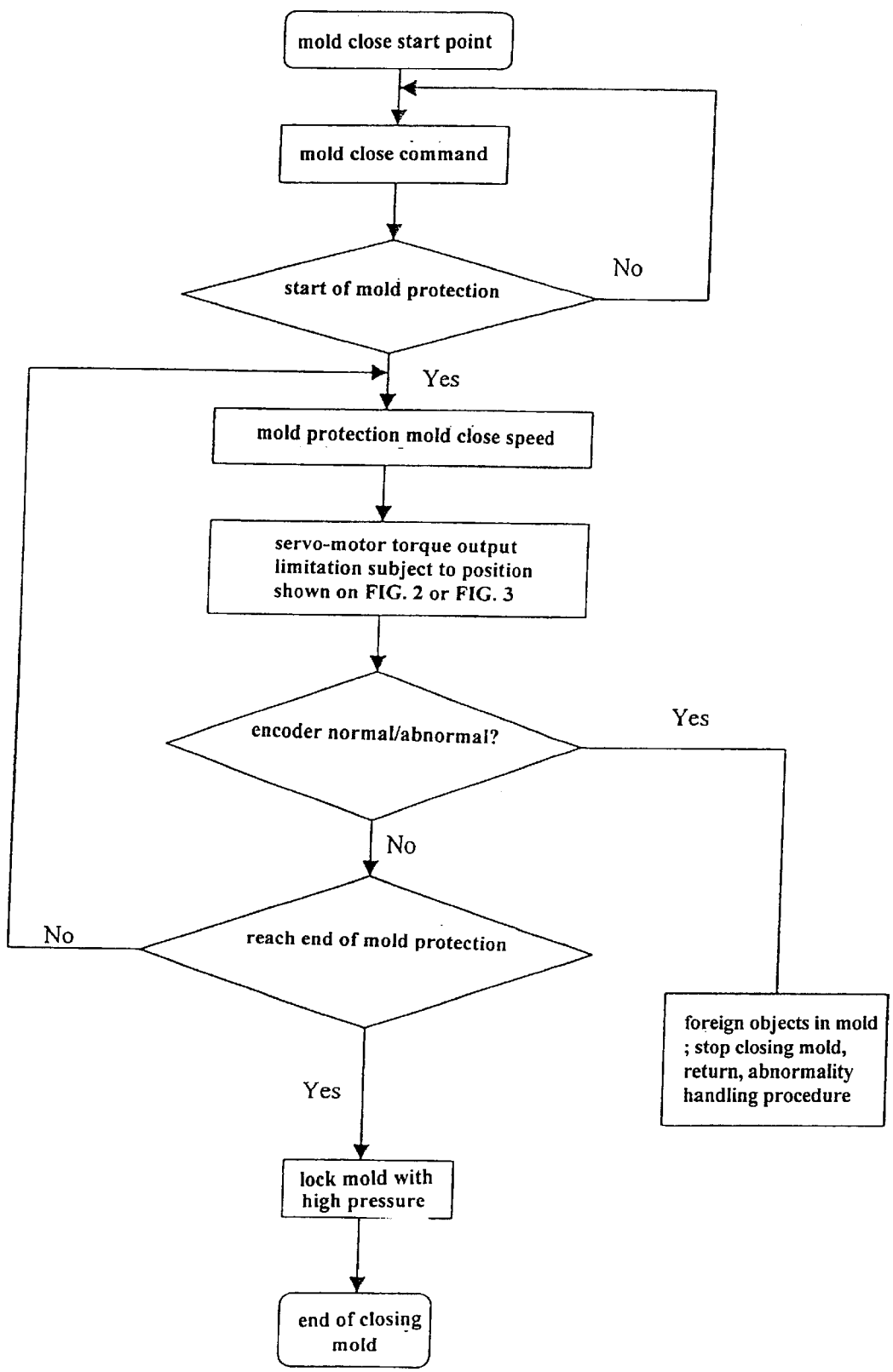
FIG. 1 is a flow chart of a preferred embodiment of the present invention.
Figure 3:
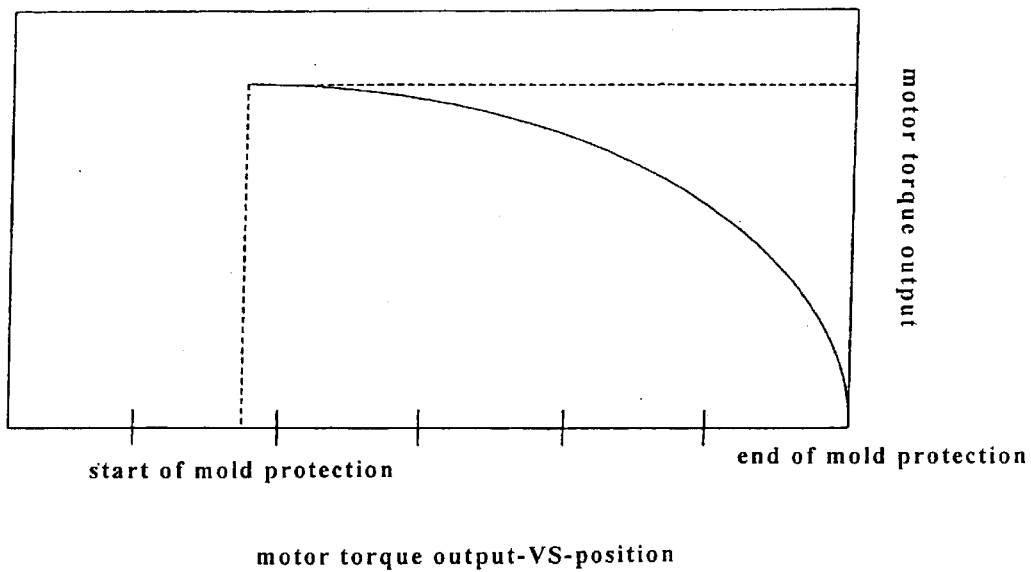
FIG. 3 is a motor torque output-VS-position curve obtained according to the present invention.

As illustrated in FIG. 1, set the speed of the movable die to pass through the mold protection zone at first, and then give a mold clamping command to move the movable die to the start point of the mold protection zone, and then feed the movable die subject to the set speed and control the torque output of the servo-motor subject to the different position of the movable die in the mold protection zone, enabling a low-pressure push force to be applied to the mold subject to the different mechanical advantage produced by the toggle mechanism. During movement of the movable die in the mold protection zone, the encoder compares the set parameter values with the actual values produced during actual action. When an error value is produced, it is assumed that there is a foreign object in the mold, and an abnormality handling procedure is followed. If no error value is produced, continue the mold clamping action, and then lock the movable die and the fixed die with a high pressure after the movable die passed through the end of the mold protection zone to complete the mold clamping action.

The servo-driven type mold clamping unit mold protection method of the present invention achieves the following advantages.

(A). Because the torque of the servo-motor is changed subject to the position of the movable die (i.e., subject to the change of the mechanical advantage of the toggle mechanism) to keep the movable die in motion at the set speed, the mold is pushed by a push force of low pressure in the mold protection zone without forcing the mold against the foreign object, if any, and therefore the mold is prevented from being damaged.

(B) Because the encoder of the servo-motor has set the values required for keeping normal motion of the mold on the parameters of the servo-motor torque, movable die position, movable die displacement time, and speed of movable die and provided a command pulse signal to the servo-motor subject to the set values, it compares the values obtained from the actual action with the set values to check if there is any foreign objects in the mold, and then proceeds, to the necessary abnormality handling procedure immediately upon the presence of an abnormality, preventing damage to the mold.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for protecting a mold in a servo-driven mold clamping unit comprising the steps of:
   a. changing the torque output of a power source generated by a servo-motor subject to the position of a movable die in the mold; and
   b. comparing values set in an encoder of the servo-motor with a signal received by an encoder when the movable die is displaced so as to detect the presence of any foreign objects in the mold for determining whether handling is normal or abnormal;
   c. wherein the relationship between the servo-motor output torque and the movable die position is expressed by the following equation:

$$Tq(x)\ \% = 1/F(x) \times \text{Gain}\ \%,$$

in which
   X is the position of the movable die;
   Tq(x) is the force, torque, produced by the servo-motor, which torque varies with the position of the movable die, and the maximum torque output is 10%;
   F(x) is the mechanical advantage of the toggle mechanism that varies with the position of the movable die; and
   Gain is the minimum torque output of the servo-motor that can move the movable die subject to a set velocity, and Gain is determined by searching for the minimum value of torque.

2. The method according to claim 1 wherein the signal received by the encoder is determined to be normal or abnormal subject to the condition that the torque output of the servo-motor is equal to the set value or is not equal to the set value.

3. The method according to claim 1 wherein the signal received by the encoder is determined to be normal or abnormal subject to the condition that the position of the movable die is equal to the set value or is not equal to the set value.

4. The method according to claim 1 wherein the signal received by the encoder is determined to be normal or abnormal subject to the condition that the displacement time of the movable die is equal to the set value or is not equal to the set value.

5. The method according to claim 1 wherein the speed of displacement of the movable die is a constant value.

6. The method according to claim 1 wherein the movable die is linked to a toggle mechanism.

* * * * *